United States Patent
Ward et al.

(10) Patent No.: US 9,139,483 B2
(45) Date of Patent: Sep. 22, 2015

(54) CONTAMINANT-FREE FERTILIZER FROM LIQUIDIZED SEWAGE SLUDGE

(71) Applicants: Owen Patrick Ward, Waterloo (CA); Ajay Singh, Milton (CA)

(72) Inventors: Owen Patrick Ward, Waterloo (CA); Ajay Singh, Milton (CA)

(73) Assignee: LYSTEK INTERNATIONAL, INC., Cambridge, Ontario (CA)

( * ) Notice: Subject to any disclaimer, the term of this patent is extended or adjusted under 35 U.S.C. 154(b) by 0 days.

(21) Appl. No.: 14/048,191

(22) Filed: Oct. 28, 2013

(65) Prior Publication Data

US 2014/0137615 A1   May 22, 2014

(51) Int. Cl.
| C02F 3/00 | (2006.01) |
| C05F 3/00 | (2006.01) |
| C02F 11/00 | (2006.01) |
| C02F 11/12 | (2006.01) |

(52) U.S. Cl.
CPC ............... *C05F 3/00* (2013.01); *C02F 11/004* (2013.01); *C02F 11/121* (2013.01); *C02F 11/127* (2013.01)

(58) Field of Classification Search
CPC .................................. C05F 3/00; C05F 11/004
USPC .......................... 210/173, 663, 680, 691–694
See application file for complete search history.

(56) References Cited

U.S. PATENT DOCUMENTS

| | | | |
|---|---|---|---|
| 3,152,983 A * | 10/1964 | Davis et al. .................. 210/611 |
| 3,767,570 A * | 10/1973 | Clapp ........................... 210/618 |
| 4,499,208 A * | 2/1985 | Fuderer ........................ 502/415 |
| 6,153,017 A | 11/2000 | Ward et al. |
| 6,251,058 B1 | 6/2001 | Ward et al. |
| 6,808,636 B2 | 10/2004 | Ward et al. |
| 7,736,511 B2 | 6/2010 | Lugowski et al. |
| 7,972,512 B2 * | 7/2011 | Conner ......................... 210/615 |
| 8,011,605 B2 * | 9/2011 | Ward et al. ...................... 241/23 |
| 8,329,035 B2 * | 12/2012 | Conner ......................... 210/615 |
| 8,349,184 B2 | 1/2013 | Ward et al. |
| 2006/0157419 A1* | 7/2006 | Karanfil et al. ............... 210/694 |
| 2006/0211906 A1* | 9/2006 | Berezutskiy ................... 585/820 |
| 2008/0023401 A1* | 1/2008 | Arato et al. .................... 210/662 |
| 2009/0107920 A1* | 4/2009 | Ward et al. .................... 210/710 |
| 2012/0028332 A1* | 2/2012 | Gronfeldt ..................... 435/188 |
| 2013/0067973 A1 | 3/2013 | Ward et al. |

* cited by examiner

*Primary Examiner* — Chester Barry
(74) *Attorney, Agent, or Firm* — Anthony Asquith Corp.

(57) ABSTRACT

Hydrophobic contaminants are removed from sludge that has been liquidized by violent shearing, by stirring a hydrophobic sorbent substance material into the sludge. After a period of time in which the contaminants are sorbed into the sorbent, the sorbent substance is separated from the sludge by gravity-settling, centrifuging, etc, where the sorbent is a liquid, or by filtration etc where the sorbent is a solid. Some sorbents have a melting point such that the sorbent can be liquid for good dispersal in heated sludge, and then can be solid when the sludge has cooled, whereby the sorbent can be removed e.g by filtration. Liquefaction by violent shearing causes the biosolids in the sludge to go into solution, which leaves the hydrophobic contaminants more available to be sorbed.

14 Claims, No Drawings

CONTAMINANT-FREE FERTILIZER FROM LIQUIDIZED SEWAGE SLUDGE

The technology disclosed herein derives from that shown in the applicants' patent publications U.. Pat. No. 6,808,636; U.S. Pat. No. 7,736,511; U.S. Pat. No. 8,011,605; U.S. Pat. No. 8,349,184; US-2009-0,107,920; US-2013-0,067,973, which relate to processes for liquidizing dewatered sewage sludge.

Also relevant is US-2006-0,211,906 (Berezutskiy, 2006). Also relevant is the Article "Removal of Emerging Contaminants from Water and Wastewater by Adsorption Process", by Grassi et al (2012).

High-solids sludges can be liquidized by violent shearing, as fully described in the mentioned publications. In short: the non-liquid high-solids sludge is placed in a shearing vessel, where the sludge is heated to e.g 70° C., and its pH is raised to e.g pH-10, and the sludge is violently sheared by means of shearing blades. The power supplied to the shearing motor is e.g 20 kW per tonne/hour of sludge-throughput.

Upon being sheared in this manner, the high-solids sludge is liquidized. Before shearing, the viscosity of 15%-solids sludge is barely measurable; after shearing, the viscosity of the liquidized 15%-solids sludge can be brought down to e.g 10,000 centiPoise, or less.

At this, the liquidized 15%-solids sludge is now eminently classifiable as a liquid, in that the sludge, placed in a container, quickly settles, liquid-like, to a horizontal surface. Liquidized 15%-solids sludge also can be readily pumped through pipes, like a (somewhat viscous) liquid.

Following liquefaction, the water released from the torn-open cells does not become loose, in the sense that the released water is separate from the solids. Rather, the liquidized sludge is a highly-homogeneous aqueous liquid. Before shearing, dewatered sewage sludge can be regarded as clusters of solids suspended in a medium of liquid water. Un-sheared sludge can be regarded as a body of lumps or clumps of agglomerated solids surrounded by loose water.

In sheared sludge, the solids have been hydrolysed and solubilized. In sheared sludge, it should not be regarded that the solids—well-dispersed in the water—remain separate from the water. Rather, the solids are dissolved in the water. Sheared sludge (i.e liquidized sewage sludge) should be regarded as a homogeneous aqueous liquid, even when measured on a microscopic scale, i.e at a below-cellular scale.

Liquidized sludge does or might contain some discernably-solid particles, but predominantly these solid particles are particles of e.g non-biological grit etc that was present in the raw sewage. It should be regarded that the torn pieces of the biological cells, including the cell walls, have been hydrolysed and have effectively dissolved into the water. Thus, upon liquefaction, the solid cell materials have become liquid components of the liquidized sludge.

When it comes to disposing of biosolids sludge, liquidized sludge is much simpler to dispose of than non-liquidized sludge. Also, the fact of liquefaction makes more options available, as to just how the sludge might be disposed of.

It is desirable, environmentally, that sewage sludge should be recycled. Many of the agricultural nutrients that went into producing food, for example, are present in the sludge, and would be lost if the sludge were to be dumped in a landfill, and especially if the sludge were to be e.g incinerated.

Spreading the biosolids sludge from human sewage on agricultural fields is highly favoured from the recycling standpoint. And liquidized high-solids sludge is physically much easier to transport to the fields, and to spread on the fields, than non-liquidized high-solids sludge.

Sewage sludge contains, not just agricultural nutrients, but contaminants that have entered the sewage through human activities. Detergent and pharmaceutical substances are some examples of contaminants that can be present.

These contaminants are present in low enough concentrations that major jurisdictions perceive no risk to human health. However, there is a concern that the introduction of any contaminant must be regarded as detrimental. The present technology is concerned with removing contaminants from liquidized sewage sludge, and with thereby removing one of the barriers to the desired agricultural recycling of sewage sludge.

It is recognized, in the present technology, that, unless the sludge has been liquidized, it is not practically possible to remove the contaminants. It is recognized that, when the sludge has been liquidized, now it becomes possible to separate and remove the contaminants from the liquidized sludge.

The present technology lies in a procedure for removing a hydrophobic contaminant from liquidized sewage sludge. The procedure includes mixing a hydrophobic sorbent substance and the liquidized sludge in a vessel. The mixture of the hydrophobic sorbent substance and the liquidized sludge is left for such a residence time period that the hydrophobic contaminant is substantially sorbed out of the sludge and into the hydrophobic sorbent substance. The hydrophobic sorbent substance should be so constituted as to be capable, having been mixed into the sludge, of then being physically separated from the sludge, and the procedure includes physically separating the now-contaminant-laden hydrophobic sorbent substance from the liquidized sludge.

It is not suggested that the procedure will always be effective to remove all traces of all contaminants from the liquidized sludge, but rather that the procedure will remove a significant portion of the contaminants.

The technology is effective to remove the contaminants because the contaminants in question are predominantly hydrophobic. Because the sorbent material is also hydrophobic, the contaminants bind to the sorbent.

As described below, there are a number of substances that can serve as the hydrophobic sorbent substance. But first, the hydrophobic contaminants are described and discussed.

The present procedure is effective to remove hydrophobic contaminants from liquidized sludge. In fact, the procedure is effective to remove substantially all hydrophobic substances, whether contaminants or not; the use of a hydrophobic sorbing agent to sorb hydrophobic components out of the liquidized sludge is not selective.

Thus, a question might arise whether there are any hydrophobic substances that will be removed from liquidized sludge, by the hydrophobic sorbing agent, which desirably should be left in the sludge—such as substances that are of use as agricultural nutrients. It is recognized that, generally, there are no such substances of significance in liquidized sewage sludge.

Hydrophillic components of the liquidized sludge will not be sorbed out by the use of a hydrophobic sorbing agent. Thus, a question might also arise whether there are any hydrophillic contaminant substances in liquidized sludge, which are contaminants, and which it would be desirable to separate from the sludge before the sludge is applied to the agricultural fields. Again, it is recognized that there are no such substances of significance in liquidized sewage sludge.

Of course, there are some hydrophillic substances in raw sewage that are, or might be, regarded as contaminants. However, those contaminants, being hydrophillic, tend to remain with the loose water component of the raw sewage. The act of dewatering the sewage separates and removes the loose water from the biosolids, and the hydrophillic contaminants go with the loose water. Thus, usually, there are no hydrophillic substances (of significance) left in the dewatered high-solids sludge.

As to the destiny of the hydrophillic contaminants, they might need to be broken down or removed from the separated loose water, but the task of removing hydrophillic contaminants from loose water is not addressed by the present technology, and indeed has nothing to do with the removal of hydrophobic contaminants from dewatered high-solids liquidized sludge, nor with the manufacture of a biosolids-fertilizer that is sufficiently contaminant-free that it can safely be spread on agricultural fields.

Regarding organic contaminants, twenty-five of the principal organic chemicals present in biosolids were commonly found in nine biosolids samples from different sources (http://toxics.usgs.gov/highlights/compounds biosolids study.html). The list included cholesterol and three other natural plant or human/animal sterols which amount to a total median sterol amount of 0.48 g/Kg dry biosolids which, as natural products found in food, can be excluded from consideration as contaminants. The median total content of the remaining twenty-one compounds was 0.367 g/Kg dry biosolids, which are regarded as contaminants. Of this total amount, nonyl-phenol (NP), a detergent metabolite, amounted to 0.261 g/Kg dry biosolids, or 71 % of the total.

The hydrophobic sorbent substance can take a number of different forms, as will now be described.

Apart from being hydrophobic, the sorbent substance should have the physical capability:
(a) of being put into and dispersed through the liquidized sludge, e.g by stirring;
(b) after the sorption residence period, of being separated and recovered from the liquidized sludge.

The hydrophobic sorbent substance may be a solid, or a liquid, or a solid/liquid. Examples of hydrophobic sorbent substances include (solid): wheat bran, polystyrene beads; (liquid) canola oil, liquid paraffin; (liquid/solid) beef suet, paraffin wax.

A solid hydrophobic sorbent substance can be removed from the liquid sludge by filtration, sieving, flocculation, gravity-settling, flotation, gas entrainment, centrifuging, and the like. A(non-miscible) liquid hydrophobic sorbent substance can be removed from the sludge by gravity-settling, centrifuging, and the like.

A liquid/solid hydrophobic substance is a substance that is solid at e.g 20° C., and liquid at an elevated temperature such as 50° C. Thus, the liquid/solid substance, when placed in liquidized sludge heated to 60° C., becomes liquid, and can be dispersed through the sludge by stirring. When the sludge is later cooled, the liquid/solid substance solidifies, and now can be separated from (and removed from) the liquidized sludge by filtration, sieving, flocculation, gravity-settling, flotation, gas entrainment, centrifuging, and the like.

A liquid/solid substance that is suitable for use in the present technology is a substance that solidifies at a temperature a little above the ambient temperature to which the sludge cools, after shearing; and is a substance that melts and becomes liquid at a temperature to which it is economical to heat the sludge. Thus, a hydrophobic sorbent substance that is liquid above e.g 60° C., and is solid below e.g 20° C., can be considered for present use as a liquid/solid substance. The preferred range of melting points is between 50° C. and 20° C.

Separation and removal of the contaminant-laden hydrophobic sorbing agent from the sludge is facilitated if the sorbent and the liquidized sludge are of different densities, whereby settling and centrifuging can aid in separation. A solid hydrophobic sorbent substance in the form of solid pellets can be filtered out of the liquidized sludge—in which case density is less important.

The conditions in the vessel in which sorption takes place should be arranged to promote sorption. Typically, heating the sludge (e.g to 60° C.) increases the rate of sorption of the hydrophobic contaminants into the sorbent material. Also, elevating the pH of the sludge (e.g to pH-9.5) also aids sorption.

These conditions of temperature and pH are present, typically, in the shearing vessel in which the shearing operation takes place. Thus, it might be considered advantageous to put the sorbent material into the sludge before, or while, shearing takes place. The advantage is that shearing of course distributes the sorbent homogeneously through the sludge, and the temperature and pH conditions that favour sorption are, very likely, already present in the shearing vessel.

Adding the hydrophobic sorbent substances to the sludge prior to shearing can be done, but only some of the otherwise-suitable hydrophobic sorbent substances can perform the sorbing function after having been subject to shearing. For example, it cannot be expected that a solid hydrophobic sorbent substance, having been sheared along with the sludge solids, could later be separated from the sludge by being filtered out of the sludge.

When the hydrophobic sorbent substances is a liquid or a liquid/solid, adding the substance to the sludge prior to shearing might be considered. However, in the case of some liquid sorbent materials, putting the sorbent material into the sludge while the sludge is being sheared results in the sorbent material becoming so thoroughly emulsified into the liquidized sludge that the sorbent cannot practically be separated, at all, thereafter. But if a particular sorbent material, having been added to the sludge before shearing, can be separated from the sludge after shearing, then that sorbent material can be used in that way, thereby realising the associated advantages.

However, generally, it is easier to separate the contaminant-laden hydrophobic sorbent substance from the liquidized sludge if the sorbent is added after the sludge has been liquidized. Then, the sorbent substance is merely gently stirred into the sheared sludge.

In Table 1(a) below, 0.375 grams of (liquid) nonyl-phenol was added to a 250-gram batch of liquidized sludge. Table. 1(b) shows that the solid sorbent (wheat bran pellets) was effective to sorb 52% of the nonyl-phenol out of the sludge. The laden solid sorbent was removed from the sludge by simple filtration.

TABLE 1

Effect of treatment of biosolids with sorbents with potential to bind hydrophobic contaminants

| Action Description | Control Sample (a) | Sorbent-treated Sample (b) |
|---|---|---|
| Weight of sheared liquid biosolids | 250 g | 250 g |
| pH of sheared liquid biosolids | 9.5 | 9.5 |
| Water added | 125 g | 125 g |
| Nonyl-phenol added | 0.375 g | 0.375 g |
| Treatment: | | |
| Add Sieve Retained Wheat Bran (mesh 1.5 mm) Mix in and hold for 10 d | 0 | 37.5 g |
| Passed treated sample though same Sieve to remove Wheat Bran | No | Yes |
| Nonyl Phenol Determination | 12000 µg/g | 5800 µg/g |
| Percentage removal of Nonyl-Phenol | — | 52 percent |

In Table. 2 below, the hydrophobic sorbing agent was variously a liquid (liquid paraffin, canola oil) and a liquid/solid (suet). After the period of sorption, the sorbing agent was separated from the sludge by centrifuging. Once separated, it was a simple matter to remove the contaminant-laden sorbent from the sludge.

The results indicate that sorption was effective to separate (all enable removal of) up to 76.5% of nonyl phenol from the liquidized biosolids.

The results indicate that more of the contaminants are removed when the viscosity of the liquidized sludge is lower. Also, it is clear that heating the sludge during sorption, and raising the pH, are likely to improve removal. These things are simple enough to be determined by routine experiment in the particular case.

TABLE 2

Extraction of spiked nonyl phenol (NP) (1000 ppm added by homogenizing) from Liquidized Biosolids

| percent Biosolids concentration | Extracting Agent | Heat to 60° C. | Description of separation top layer | % NP removal over control |
|---|---|---|---|---|
| 10% solids | None | — | None | Control |
| 10% solids | Liquid paraffin 10% | — | Emulsion layer | 71.7 |
| 10% solids | Canola Oil 10% | Yes | Lipid layer | 61.9 |
| 10% solids | Suet 5% | Yes | Hard Cap | 60.6 |
| 6.6% solids | None | — | None | Control |
| 6.6% solids | Suet 5% | Yes | Hard Cap | 71.2 |
| 6.6% solids | Canola Oil 5% | Yes | Lipid Layer | 76.5 |

The results show that hydrophobic contaminants can be readily sorbed out of liquidized sludge, whereas such contaminants can be very difficult if not impossible to separate from sludge that has not been liquidized.

Generally, the hydrophobic contaminants bind to the biological cells in the dewatered sludge. Similarly, the contaminants tend to bind also to other organic solids present, such as paper, simply because paper is hydrophobic.

The hydrophobic contaminants tend to bind to agglomerations of hydrophobic materials. The larger the hydrophobic agglomeration, the more robustly the hydrophobic contaminants tend to bind to it. One benefit of liquefaction is that, the liquidized sludge being highly homogeneous, the agglomerations no longer exist, whereby the hydrophobic contaminants have nothing to bind to, and thus are more readily available to be attracted to the hydrophobic sorbent materials that are introduced into the sludge.

Liquefaction also reduces the viscosity of the sludge, and the lower the viscosity, generally, the more readily the hydrophobic sorbent materials can be separated from the sludge.

The present technology for removing hydrophobic contaminants, though described in relation to sewage sludge containing human biosolids, can be applied to other sludges. The sludges can arise from biological processes generally, including agricultural and food wastes and wastewater treatment processes.

The technology can be applied also to animal manure. Often, when animal manure is spread on agricultural fields, as fertilizer, it is the raw manure that is applied directly to the fields. The present technology is not applicable to raw animal manure, just as it is not applicable to raw human sewage. The present technology can be applied when the manure has been dewatered and then liquidized.

Animal manures can contain significant levels of veterinary pharmaceutical and their metabolites and other agricultural products, which should be removed prior to the sludge being applied to the fields.

Some of the terms used in this specification are defined below.

Hydrophobic

The terms "hydrophobic" and "hydrophillic" may be defined as follows. Octanol is a hydrophobic solvent and water is a hydrophillic solvent: when substances are added to a liquid comprising equal volumes of water and octanol, hydrophobic substances partition in higher concentrations in the octanol than in the water, while hydrophillic substances partition in higher concentrations in the water than in the octanol.

Hydrophobic sorbents attract, pick up, and retain, hydrophobic substances from a liquid, but repel, and consequently do not retain, hydrophillic substances.

The definition can be alternatively expressed as: A hydrophobic substance is a substance of which its solubility in octanol is greater than its solubility in water, under equivalent conditions. The referred-to solubility is measured in grams of the substance per kilogram of water.

Contaminant

A contaminant is defined as a substance that, if left in the sludge that is to be spread on the fields, is or might be hazardous, or contaminates the sludge, or renders the sludge odorous. The contaminant is any undesirable chemical component which may be perceived as having a risk of causing a negative impact on health or the environment or on quality of life.

Violent Shearing

Violent shearing is quite different from e.g vigorous stirring. Violent shearing is shearing in which the biological cells in the sludge are torn apart and disintegrated by the shearing blades. The solid material content of the cells is hydrolysed, and the chemical bonds of the solid cellular materials are disrupted, whereby the materials basically dissolve into solution.

Usually, shearing is carried out in a reactor vessel in which the sludge is heated (e.g to 60° C.) and its pH is elevated (e.g to pH-9.5). Those parameters aid the hydrolysis reactions and the solubilization of the solids. Shearing is done typically at twenty kW-hrs per tonne of the dewatered sludge, i.e per tonne of the whole sludge material in the vessel.

Liquidize

Liquidized sludge is sludge that has been subjected to violent shearing, such that the sheared sludge has a viscosity of e.g 10,000 cP or lower. The liquidized sludge, as to its physical constitution, is substantially completely homogeneous. That is to say, liquidized sludge is homogeneous even on a microscopic, sub-cellular scale. The bio-cellular materials in the liquidized sludge are substantially not discernible, in the liquidized sludge, as solids. Basically, the biosolids have passed into solution.

Liquidized sludge is a liquid in the sense that a liquid, when placed in a vessel, settles to a flat horizontal surface. Liquidized sludge can be viscous, but has a measurable viscosity. Generally, liquefied sludge is liquefied to a viscosity of 10,000 cP or less.

"Liquidize" and "liquefy" have the same meaning.

Raw Sewage

Raw sewage is sewage that has not yet been dewatered, as it appears at e.g a municipal water treatment plant. Included is sewage that has been collected e.g from septic tanks, which typically has already been subjected to settling and to some anaerobic digestion treatment reactions. Typically, one tonne (1000 kg) of raw sewage comprises 30 kg of dry solids accompanied by 970 kg of water. Typically, the solids are 75% organic (of which e.g 60% is biological cells, plus e.g paper) and 25% inorganic materials (e.g grit etc).

Dewatered Sewage

Dewatered sewage or dewatered sludge is raw sewage from which a substantial quantity of loose water has been removed, e.g by belt-pressing, screw-pressing, centrifuging, etc. Dewatering by simple pressing squeezes out much of the loose water. Pressing one tonne of raw 3%-solids sewage typically removes e.g 700 kg of water, reducing the water content from 970 kg to 270 kg. Thus, the remaining 300 kg of sewage includes 30 kg of dry solids, and can be described as 10%-solids sludge. Similarly, in 15%-solids sludge, the 30 kg of dry solids is accompanied by 170 kg of water; in 300-solids sludge, the 30 kg of dry solids is accompanied by 70 kg of water.

10%-solids sludge is liquid, in the sense that its viscosity can actually be measured. 15%-solids sludge is stiff and sticky. 30%-solids sludge is dry and cake-like, and has no liquidous aspects. As described in the said patents, these barely-liquid sludges can be liquidized by violent shearing, to a viscosity of e.g 10,000 centiPoise, or lower.

Dry Solids

Dry solids are the solid remains of the sludge after all water has been driven off. The dry condition can be achieved under laboratory conditions using special drying furnaces. Generally, in commercial large-scale water and sludge treatment plants, it is rare to remove so much water as to make the sludge drier than about 20%-solids, and it is usually not economically practical to make the sludge drier than about 30%-solids (unless the sludge is destined, for example, to be incinerated).

Sludge

Sludge is what remains of sewage after loose water has been removed by dewatering. Sludge can be liquid (having viscosity of 20,000 cP or less), barely-liquid (20,000 cP to 100,000 cP), or solid (viscosity not measurable).

Loose/Bound Water

"Loose" water is water that is present in raw sewage, and is the large volume of water in which the solids are suspended. "Bound" water is water that is present in sewage, and is bound up inside the biological cells of the sewage.

Dewatering removes loose water, but substantially does not remove bound water. Shearing releases the bound water from the cells.

The invention claimed is:
1. Procedure for removing a hydrophobic contaminant from liquidized sewage sludge, including:
   [2] mixing a hydrophobic sorbent substance and the liquidized sludge in a vessel, forming a mixture thereof;
   [3] then leaving the hydrophobic sorbent substance mixed into the liquidized sludge for such residence time period that the hydrophobic contaminant is substantially sorbed out of the sludge and into the hydrophobic sorbent substance;
   [4] where the hydrophobic sorbent substance is so constituted as to be capable, having been mixed into the sludge, of then being physically separated from the sludge;
   [5] then physically separating the now-contaminant-laden hydrophobic sorbent substance from the liquidized sludge.
2. As in claim 1, including stirring the mixture in the vessel to such effect that the hydrophobic sorbent substance is distributed substantially evenly through the liquidized sludge.
3. As in claim 2, including:
   [2] where the hydrophobic sorbent substance is so constituted as to be capable, having been mixed into the sludge, of being physically filtered out of the sludge;
   [3] separating the contaminant-laden hydrophobic sorbent substance from the sludge by passing the mixture through a physical filter, of such mesh size as to filter out the hydrophobic sorbent substance from the sludge.
4. As in claim 2, including:
   [2] where the hydrophobic sorbent substance, prior to being mixed with the sludge in the vessel, is in the form of solid pellets;
   [3] where the pellets are of such large size that the pellets cannot pass through a filter;
   [4] where the pellets have the capability to remain physically intact upon being mixed into the sludge;
   [5] gently mixing the solid pellets into the liquidized sludge, substantially without affecting the size of the pellets;
   [6] separating the contaminant-laden hydrophobic sorbent substance from the sludge by passing the mixture through a physical filter, of such mesh size as to filter out the pellets.
5. As in claim 2, including:
   [2] where the hydrophobic sorbent substance, upon being mixed with the sludge in the vessel, is in liquid form;
   [3] mixing the hydrophobic sorbent liquid into the liquidized sludge;
   [4] where the hydrophobic sorbent liquid, having been mixed with the liquidized sludge in the vessel for the residence time period, has the capability, in relation to the liquidized sludge, to be substantially separated physically from the liquidized sludge;
   [5] physically separating the now-contaminant-laden hydrophobic sorbent liquid from the liquidized sludge.
6. As in claim 5, including:
   [2] where the hydrophobic sorbent liquid and the liquidized sludge are of different densities;
   [3] physically separating the now-contaminant-laden hydrophobic sorbent liquid from the liquidized sludge by gravity-settling or by centrifuging.
7. As in claim 2, including:
   [2] where the hydrophobic sorbent substance has a melting point MP° C.;
   [3] below MP° C., the substance is substantially solid, and
   [4] above MP° C., the substance is substantially liquid;
   [5] mixing the substance into the sludge while the substance and the sludge in the vessel are at a temperature higher than MP° C.
8. As in claim 7, including:
   [2] at the expiry of the residence time, enabling the mixture to cool to a temperature below MP° C., whereby the substance becomes solid;
   [3] physically separating the now-contaminant-laden and now-solid hydrophobic sorbent from the liquidized sludge.
9. As in claim 8, including separating the solid sorbent from the liquidized sludge by gravity-settling or by centrifuging.
10. As in claim 8, including separating the solid sorbent from the liquidized sludge by physical filtration.
11. As in claim 1, wherein:
   [2] the sludge has been liquidized by violent shearing;
   [3] the sludge contains bio-cellular materials, which have been thoroughly hydrolysed and solubilized into the sludge by the shearing;
   [4] the liquidized sludge, as to its physical constitution, is substantially completely homogeneous, including on a microscopic sub-cellular scale; and
   [5] the bio-cellular materials are substantially not discernible, in the liquidized sludge, as solids.

12. As in claim 1, wherein the sludge is sludge that, prior to shearing, was dewatered to ten percent solids, or more.

13. As in claim 1, wherein:
[2] the liquidized sewage sludge in the vessel contains a mass of hydrophobic contaminants;
[3] the procedure is effective to diminish the mass of hydrophobic contaminants in the sludge by at least fifty percent.

14. Biosolids fertilizer, characterized in that:
[2] the fertilizer has been manufactured from liquidized biosolids sludge;
[3] upon being liquidized, the sludge contained a mass of hydrophobic contaminants;
[4] after liquefaction, the hydrophobic contaminants have been diminished by at least fifty percent by the use of a procedure that embodies every word of claim 1.

* * * * *